(12) United States Patent  
Mackamul (10) Patent No.: US 8,807,129 B2  
(45) Date of Patent: *Aug. 19, 2014

(54) TRACKER DRIVE SYSTEM AND SOLAR ENERGY COLLECTION SYSTEM

(76) Inventor: Kevin Keith Mackamul, Simi Valley, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 12/941,427

(22) Filed: Nov. 8, 2010

(65) Prior Publication Data

US 2011/0139145 A1 Jun. 16, 2011
US 2014/0174431 A9 Jun. 26, 2014

Related U.S. Application Data

(63) Continuation of application No. 11/199,442, filed on Aug. 8, 2005, now Pat. No. 7,836,879.

(60) Provisional application No. 60/600,263, filed on Aug. 10, 2004.

(51) Int. Cl.
*F24J 2/38* (2014.01)
*F24J 2/54* (2006.01)
*H01L 31/042* (2014.01)
*F24J 2/52* (2006.01)

(52) U.S. Cl.
CPC . *F24J 2/541* (2013.01); *F24J 2/523* (2013.01); *Y02E 10/47* (2013.01); *F24J 2/5413* (2013.01); *Y02E 10/50* (2013.01); *F24J 2002/5468* (2013.01); *F24J 2002/5441* (2013.01); *H01L 31/0422* (2013.01)
USPC ........... 126/600; 126/605; 126/606; 126/607; 136/246

(58) Field of Classification Search
USPC .................. 126/600, 605, 606, 694; 136/246
See application file for complete search history.

(56) References Cited

U.S. PATENT DOCUMENTS 1,946,184 A * 2/1934 Abbot .......................... 126/603
3,942,879 A 3/1976 Pledger
4,000,734 A 1/1977 Matlock et al.
(Continued)

FOREIGN PATENT DOCUMENTS

CH 693 244 A5 4/2003
DE 10247177 A1 4/2004

OTHER PUBLICATIONS

International Search Report, PCT/US08/84217, dated Jan. 15, 2009.
German Examination Report, dated Oct. 25, 2007.

(Continued)

*Primary Examiner* — Steven B McAllister
*Assistant Examiner* — Nikhil Mashruwala
(74) *Attorney, Agent, or Firm* — Lewis Brisbois; Bisgaard & Smith LLP; Jon E. Hokanson (57) ABSTRACT

A tracker drive system is provided for rotatably driving one or more objects, for example solar panels or other equipment. The system comprises a torque element mounted for rotation about a generally horizontal axis, wherein the torque element can support one or more objects for rotation therewith about the generally horizontal axis; a lever arm connected with the torque element, the lever arm being movable to rotate the torque element; a movable drive member that is drivable by a drive mechanism; and a dynamic coupler coupling the drive member with the lever arm such that the lever arm is drivable by the drive member to rotate the torque element.

11 Claims, 9 Drawing Sheets

(56) References Cited

U.S. PATENT DOCUMENTS

| | | | |
|---|---|---|---|
| 4,103,672 A | 8/1978 | Meyer | |
| 4,109,638 A | 8/1978 | Matlock et al. | |
| 4,143,640 A | 3/1979 | Pierce | |
| 4,153,039 A * | 5/1979 | Carroll | 126/605 |
| 4,159,710 A | 7/1979 | Prast | |
| 4,184,482 A | 1/1980 | Cohen | |
| 4,187,123 A | 2/1980 | Diggs | |
| 4,193,391 A | 3/1980 | White | |
| 4,297,572 A | 10/1981 | Carlton | |
| 4,316,448 A | 2/1982 | Dodge | |
| 4,345,582 A | 8/1982 | Aharon | |
| 4,566,434 A | 1/1986 | Lindenbauer | |
| 4,804,291 A | 2/1989 | Everett | |
| 4,807,072 A | 2/1989 | Ono et al. | |
| 4,867,133 A | 9/1989 | Sadler | |
| 4,956,899 A | 9/1990 | Green | |
| 4,968,355 A * | 11/1990 | Johnson | 136/246 |
| 4,995,377 A | 2/1991 | Eiden | |
| 5,228,924 A | 7/1993 | Barker et al. | |
| 5,325,844 A * | 7/1994 | Rogers et al. | 126/605 |
| 5,542,409 A * | 8/1996 | Sampayo | 126/606 |
| 5,798,517 A | 8/1998 | Berger | |
| 6,058,930 A * | 5/2000 | Shingleton | 126/600 |
| 6,123,067 A | 9/2000 | Warrick | |
| 6,302,099 B1 | 10/2001 | McDermott | |
| 6,563,040 B2 | 5/2003 | Hayden et al. | |
| 6,643,960 B2 | 11/2003 | Manfiotto | |
| 6,848,442 B2 * | 2/2005 | Haber | 126/600 |
| 7,000,608 B2 | 2/2006 | Loschmann | |
| 7,275,283 B2 | 10/2007 | Kistner et al. | |
| 7,309,926 B2 * | 12/2007 | Watt | 290/1 R |
| 7,531,741 B1 * | 5/2009 | Melton et al. | 136/246 |
| 7,647,924 B2 * | 1/2010 | Hayden | 126/600 |
| 7,823,583 B2 * | 11/2010 | Allen et al. | 126/696 |
| 8,273,978 B2 * | 9/2012 | Thompson et al. | 136/244 |
| 8,459,249 B2 * | 6/2013 | Corio | 126/600 |
| 2003/0172922 A1 | 9/2003 | Haber | |
| 2004/0238025 A1 | 12/2004 | Shingleton | |
| 2004/0245782 A1 * | 12/2004 | Loschmann | 290/1 R |
| 2006/0044511 A1 | 3/2006 | Mackamul | |
| 2007/0215145 A1 | 9/2007 | Hayden | |
| 2008/0251115 A1 * | 10/2008 | Thompson et al. | 136/251 |
| 2008/0308091 A1 * | 12/2008 | Corio | 126/606 |
| 2010/0139646 A1 * | 6/2010 | Barsun et al. | 126/600 |
| 2010/0252030 A1 * | 10/2010 | Marcotte et al. | 126/694 |
| 2012/0158362 A1 * | 6/2012 | Vandevelde et al. | 702/183 |
| 2014/0053825 A1 * | 2/2014 | Zhou | 126/606 |

OTHER PUBLICATIONS

International Search Report, PCT/US2005/028198, dated Dec. 7, 2005.

Written Opinion, PCT/US2005/028198, dated Aug. 8, 2005.

\* cited by examiner

TRACKER DRIVE SYSTEM AND SOLAR ENERGY COLLECTION SYSTEM

CROSS REFERENCE TO RELATED APPLICATION

This application is a continuation application of U.S. application Ser. No. 12/274,665, filed 20 Nov. 2008, and claims the benefit of U.S. Provisional Application 60/600,263 filed 10 Aug. 2004, and U.S. application Ser. No. 12/274,665, filed 20 Nov. 2008.

BACKGROUND OF THE INVENTION

In one aspect, the present invention relates to a tracker drive system for rotatably driving one or more objects Such a tracker drive system may suitably be employed to rotate solar panels or other objects throughout the day so as to track, for example, the motion of the sun relative to the earth.

In another aspect, the invention relates to a solar energy collection system.

Due to growing energy needs and increasing environmental concerns, solar energy has become a popular alternative to traditional energy sources such as fossil fuels. Solar energy is produced within the sun by nuclear fusion. A small fraction of this energy reaches the earth's surface as shortwave electromagnetic radiation. Solar energy collection systems are essentially an arrangement of solar energy collectors collecting this electromagnetic radiation. Solar energy collectors are often embodied in the form of solar panels. The solar panels are positioned to capture or intercept the sun's radiation and to convert the energy into another form of energy (for example, electricity and/or heat). Much progress has been made in the design of these solar energy collection systems. Earlier systems were stationary and absorbed electromagnetic radiation at varying incident angles throughout the day.

More recently, tracker drive systems have been incorporated into these solar energy collection systems. These tracker drive systems allow the solar energy collectors, or solar panels, to move and thereby track the sun's path during the day. In this way, a more direct solar panel face is presented to the sun, which increases the direct solar intensity of the collected radiation and enhances the solar optical properties of the irradiated surfaces of the solar panels. By collecting the sun's rays at a generally normal angle of incidence, the solar panels offer a maximum active surface to receive the light resulting in optimal efficiency in collecting and converting radiation energy.

Examples of solar energy collection systems employing a tracker drive system are disclosed in U.S. Pat. Nos. 4,297,572 and 6,058,930.

Of these patents, U.S. Pat. No. 4,297,572 discloses solar panels, having a parabolic cross section, arranged for pivotal movement driven by a reversible electric motor via a gear box. It also discloses a tracking sensor for maintaining the solar panel in its predetermined orientation relative to the sun.

U.S. Pat. No. 6,058,930 discloses a horizontal tracker driver formed of a linear actuator having a body portion that is attached to a fixed mount set into the earth at some distance from the footing that supports the solar panels. The solar panels are supported on a torque tube that is connected to a torque arm. The actuator has a generally horizontal rod member that is pinned to the distal end of the torque arm with pivot pin to eye members. The body portion of the actuator is pivotingly mounted to adapt to the arcuate path of the pivot pin to eye members.

SUMMARY OF THE INVENTION

In one aspect, the invention provides a tracker drive system for rotatably driving one or more objects, for example solar panels or other equipment. Embodiments of the tracker drive system of this invention comprise a torque element mounted for rotation about an axis, which may be but is not required to be a generally horizontal axis. The torque element can support one or more objects for rotation therewith about said axis. A lever arm is connected with said torque element, said lever arm being movable to rotate said torque element. A movable drive member is provided, as well as a dynamic coupler coupling said movable drive member with said lever arm such that said lever arm is drivable by said movable drive member to rotate said torque element.

The drive member is drivable by a drive mechanism that in one embodiment may include a linear actuator.

As used herein, the dynamic coupler allows for at least two degrees of freedom of movement of the drive member relative to the lever arm.

Herewith, a pivoting montage of the drive mechanism can be avoided because this degree of freedom is no longer necessary.

In one embodiment, the dynamic coupler confers a translational degree of freedom in addition to a rotational degree of freedom of the drive member relative to the lever arm.

In another aspect, the invention provides a solar energy collection system. The solar energy collection system comprises
a first row of solar panels;
at least a second row of solar panels; and
a tracker drive system comprising:
a first torque element associated with said first row of solar panels and
a second torque element associated with said second row of solar panels. Each of said torque elements are mounted for rotation about a generally north-south axis and support said first or second row of solar panels for rotation therewith about the generally north-south axis. This enables light-receiving parts of the solar panels to follow the westward motion of the sun during the day.

Connected to each of the first and second torque elements are a first lever arm and a second lever arm, movable to rotate said first or second torque element. A drive member movable along a linear path is provided, and a drive mechanism is mechanically coupled with said drive member to drive said drive member along said linear path. A first dynamic coupler couples said drive member with said first lever arm and a second dynamic coupler couples said drive member with said second lever arm. The linear movement of said drive member actuates rotation of said first and second lever arms to rotate said first and second torque elements about said generally north-south axes.

In one embodiment, the solar energy collection system may also comprise:
a first foundation positioned to substantially support the load of said first row of solar panels;
a second foundation positioned to substantially support the load of said second row of solar panels; whereby said drive mechanism is mounted so as to be supported by said first and/or second foundation.

In yet another aspect, the invention provides a solar energy collection system comprising
a torque element mounted for rotation about a generally north-south directed axis, wherein one or more solar panels are supported by said torque element for rotation therewith about said axis;

a lever arm having a proximate end connected with said torque element and a distal end, said lever arm being movable to rotate said torque element and said one or more solar panels;

a drive member movable along a linear path;

a dynamic coupler coupling said drive member with said lever arm such that said lever arm is drivable by said drive member to rotate said torque element; and a drive mechanism operable to drive said drive member through said linear path and rotate said solar panels in accordance with motion of the sun relative to the earth during the day.

The invention will hereinafter be described by way of example in more detail with reference to the accompanying drawings.

DETAILED DESCRIPTION OF THE DRAWINGS

The present disclosure generally relates to a tracker drive system. Such a system may be drivable by a drive mechanism to rotatably drive one or more objects or equipment about an axis, allowing tracking of the motion of another external object or signal. The objects may be provided in the form of one or more solar panels. As such, the system is particularly suited for incorporation into a solar energy collection system. Accordingly, such a solar energy collection system is described below for exemplary purposes and as a preferred embodiment of the invention. It should be understood, however, that the present invention is not limited to such systems and that various aspects of the invention are applicable to other systems not specifically described herein.

Figure 1:
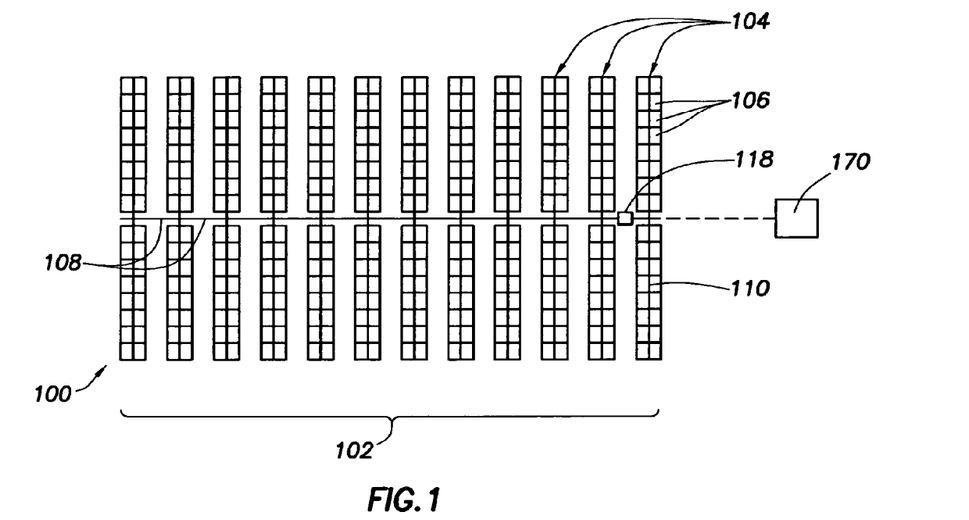
FIG. 1 is a schematically simplified plan view of a solar energy collection system according to an embodiment of the present invention, comprising rows of solar panels.
Figure 2:
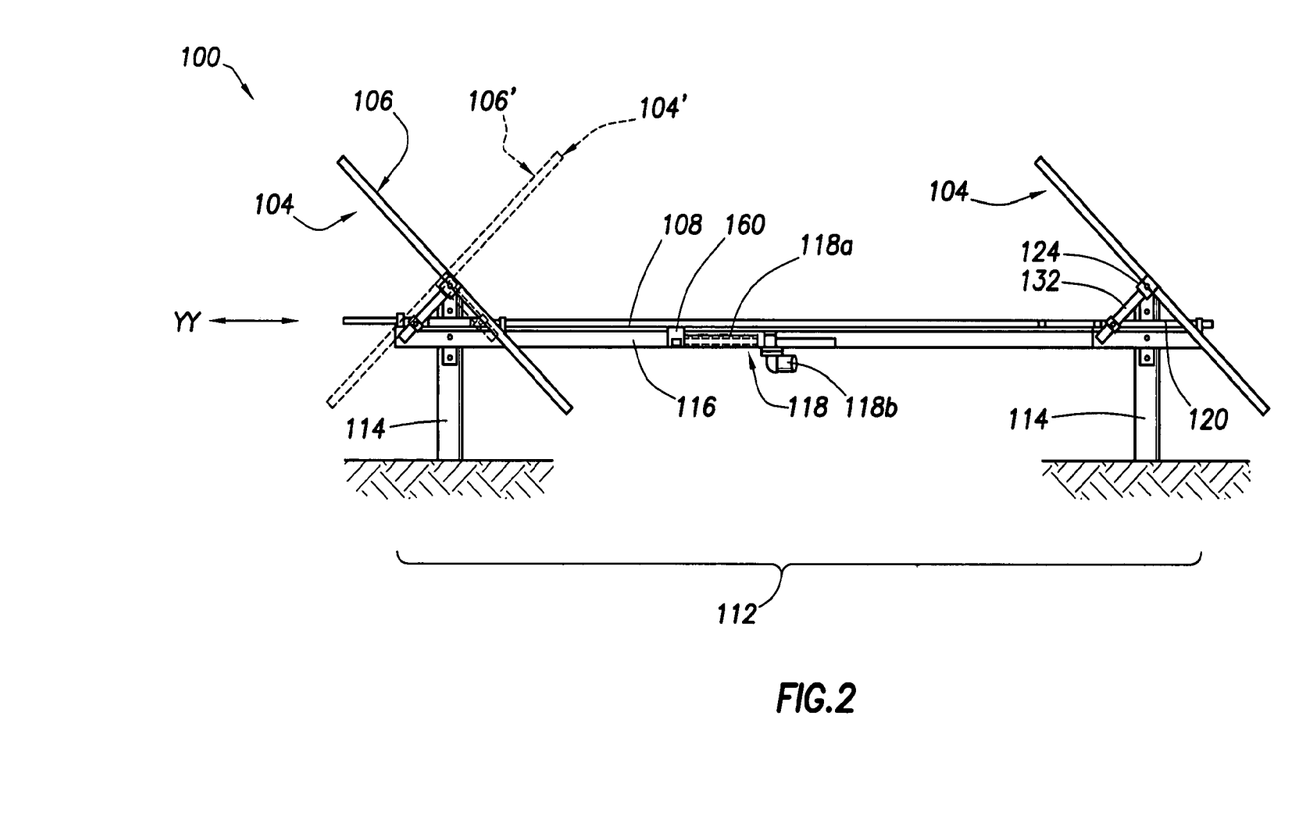
FIG. 2 is a schematic end elevation view of two rows of solar panels in the system of FIG. 1, and a tracker drive system according to an embodiment of the present invention.

FIGS. 1 and 2 provide a plan view and an end elevation view, respectively, of a solar energy collection system 100 embodying various aspects of the present invention. The system 100 may include solar panels 106, typically flat solar panels, forming an array 102 of rows 104 of solar panels 106. The solar panels 106 may be grouped in one or more sets. In the system 100 of FIGS. 1 and 2, the solar panels 106 of each row 104 may be attached to a rail 110 and distributed on either side of a drive member 108. Various alternative arrangements of solar panels may be applicable, as will become apparent to one skilled in the art upon reading and/or viewing the present disclosure.

As further described below, the system 100 also includes an embodiment of a tracker drive system 112 schematically depicted at 112 in FIG. 2. The embodiment includes movable drive member 108, which may correspond to or be coupled to the drive member introduced above, to rotatably drive the rows 104 of solar panels 106. The tracker drive system 112 may be operable through a programmable processor unit 170 or the like. In one embodiment, the programmable processing unit is programmed such that the tracker drive system 112 rotates the solar panels 106 in accordance with the motion of the sun during the day.

Figures 2A, 6:
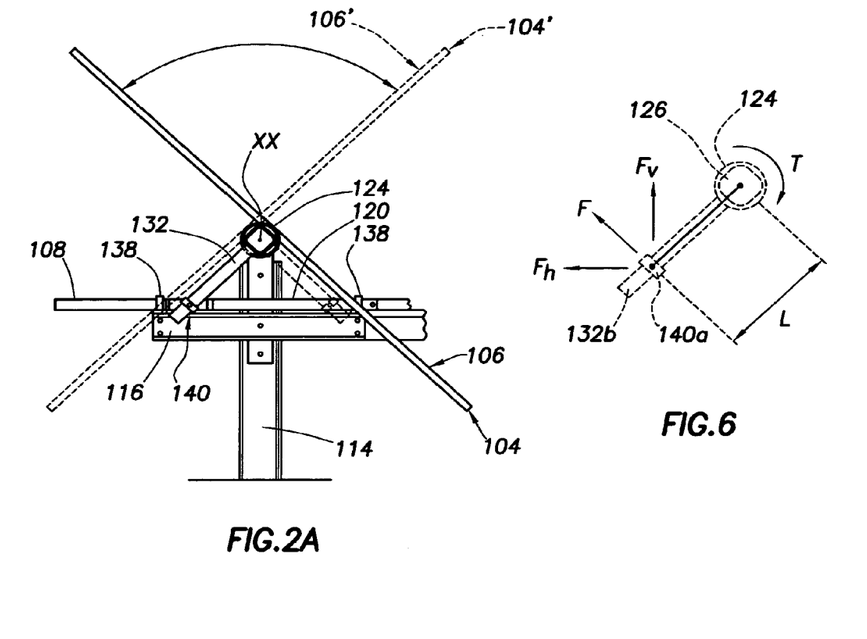
FIG. 2A is a schematic detailed view of one of the rows of solar panels in FIG. 2, illustrating two positions of the rows.
FIG. 6 is a force-body diagram illustrating the dynamic forces acting on certain components in FIG. 3.

As an example, the detail of FIG. 2A illustrates a row 104 of solar panels 106 at typical extreme positions—at sunrise and at sundown. At sunrise, the solar panels 106 may generally be facing east and preferably oriented at a first extreme angle of 30° to 60°, and more preferably, 40° to 50° (for example, 45°) from the horizontal. At sunset, the tracker drive system 112 has preferably rotated the row 104' of solar panels 106' over an operable rotation angle in a range from about 60° to 120° (in FIG. 2A, counter-clockwise), and more preferably about 80° to 100° (for example, about 90° from the first extreme sunrise position, wherein the solar panels 106' may generally be facing west. This range of rotation during the day may be referred to as the system's "operable rotation." The solar panels 106' are preferably oriented at sunset in a second extreme angle in a range of about 30° to 60°, and more preferably, about 40° to 50° from the horizontal (for example, about)45°. In FIG. 2A, the solar panels 106' are oriented about 45° from the horizontal. Typically, the solar panels can be rotated from their second to their first extreme positions before the following day's sunrise.

FIG. 2 depicts two sets of solar panels in the form of first and second rows 104 of the array 102 of solar panels 106. Each row 104 may be supported by a pair of foundations 114 (for each row 104, only one foundation 114 is shown in the end elevation view) whereby the first row is supported on the first foundation, and the second row is supported on the second foundation. Examples of suitable foundations are pier footings and spread footings.

The end elevation view of FIG. 2 generally faces the north direction such that the right hand side corresponds to the east and the left hand side corresponds to the west. Consequently the solar panels 106 rotate about a generally north-south directed axis. The axis may be extending in a generally horizontal direction, but could also be under an angle with the horizontal. This would be the case when, for instance, the tracker drive system 112 is disposed on a side of a hill. The tracker drive system could also be arranged non-horizontal by, for instance, providing foundations 114 that on one end stand taller above the surface of the earth than on an opposing end. Preferably, the objects supported by the tracker drive system are tilted to face towards the earth's equator.

Still referring to FIG. 2, a support beam 116 may extend between and may attach to successive foundations 114. The movable drive member 108 may be supported by and above the support beam 116, and may also extend between and past the foundations 114. The support beam 116 may also support a drive mechanism 118 of the tracker drive system 112.

The drive member 108 may be, for example, a tubular member or a solid rod, and may have connected thereto a driving section 120. The drive member 108 may typically have about 1" to 4" (about 0.025 to 0.1 m), for example about 3" (about 0.075 m) as a main cross sectional dimension (for example, as a rod diameter or a beam height). The driving section 120 may be a fabricated, separable tube section that can be separately designed, disassembled, and maintained—in respect to the rest of the drive member 108. The driving section 120 may also serve as an intermediate section linking two sections of the drive member 108 (for example, when the drive member 108 is designed to drive more than two rows of solar panels) or as an end section of the drive member 108

In certain embodiments of the invention, the drive mechanism 118 may be mounted so as to be supported by the same foundations 114 supporting the rows 104 of solar panels 106. A dedicated foundation for the drive mechanism is thereby made unnecessary, thus facilitating design and construction and easing cost of installation. The foundations 114 may be readily sized (depth, diameter, reinforcement, etc.) to accommodate the load provided by the drive mechanism 118.

By providing the beam 116 to support the drive mechanism 118, the drive mechanism may be easily and readily located and incorporated into the solar collection system with minimal interruption to the arrangement of the rows of solar panels. For instance, the drive mechanism 118 may be located between the rows 104 of solar panels 106. In this way, compressive forces acting on the drive members 108 are reduced (or divided between drive members).

In further embodiments, the drive mechanism 118 may be disposed in the vicinity of one of the foundations. For example, the drive mechanism may be disposed to the left of row 104 of solar panels 106 or adjacent the left foundation 114. In this way, the drive mechanism 118 is supported solely or substantially by one foundation 114 so that a support beam may not be necessary for the purpose of supporting the drive mechanism.

When a linear actuator is employed as the drive mechanism (as shown in FIG. 2), the linear actuator 118 may be an assembly that includes a screw jack 118a and a gear motor 118b (as also shown in the Figures). Other suitable linear actuators include hydraulic cylinders and ram drives. In one embodiment, the linear actuator 118 may be operatively coupled with the movable drive member 108 by way of a bracket 160.

As is further described below, operation of the linear actuator 118 drives the drive member 108 along a predetermined linear path in direction YY. In typical embodiments, the direction YY may correspond to a generally east-west direction.

As used herein, the terms "rotate" or "rotation" refer to angular motion and does not require a complete revolution (360°). Also, as used herein, the term "foundation" refers to a variety of suitable, structural supports, which are directly or indirectly founded in the earth.

Figure 3:
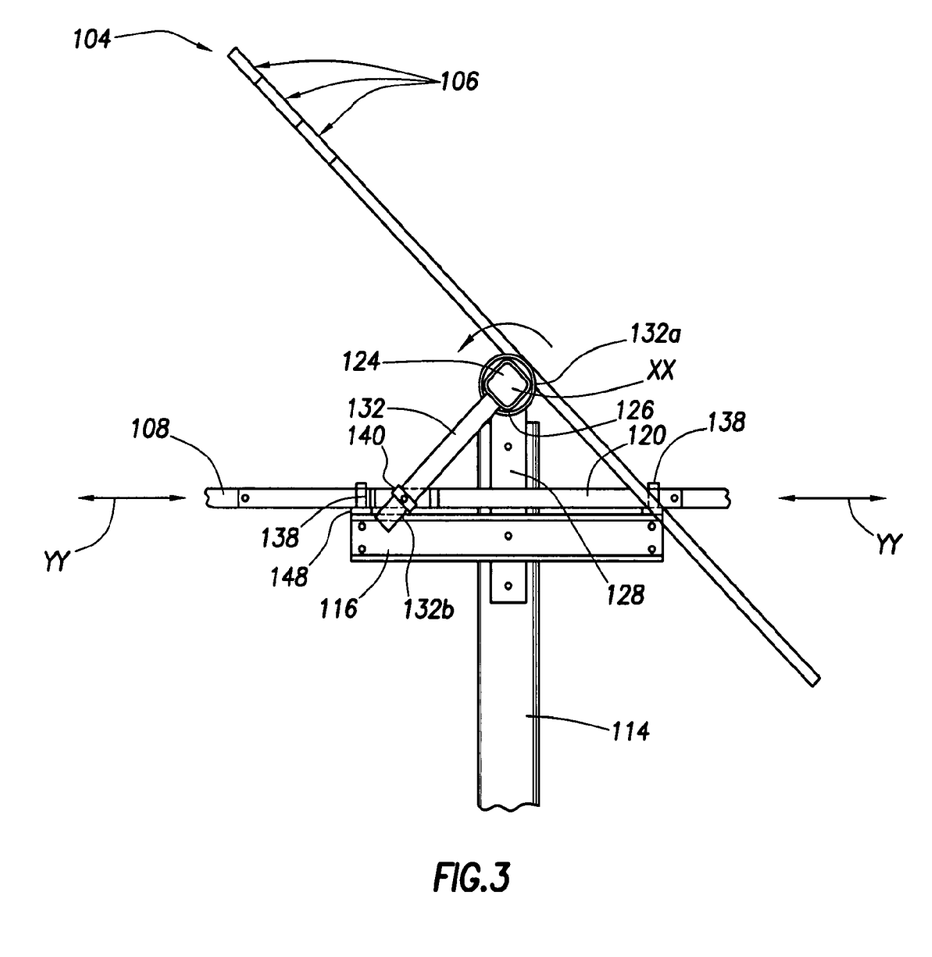
FIG. 3 is a schematic elevation view of a portion of the tracker drive system employed with a row of solar panels, according to an embodiment of the present invention.

Now referring specifically to FIG. 3, each of the rows 104 of solar panels 106 may be associated with a torque element 124. The torque element 124 is mounted for rotation about axis XX. In the embodiment of FIG. 3, the solar panels 106 are supported by torque element 124. In one embodiment, the solar panels 106 may by mounted on torque element 124. As explained above, the axis of rotation XX may be generally horizontally directed along a generally north-south axis. The torque element 124 may be rotatably supported on a pair of journal bearing mounts 126. The journal bearing mounts 126 may be provided on top of support plates 128, which are attached to the foundations 114. This may be achieved by a direct attachment to the foundations 114, or an indict attachment such as for instance via one of the support beams 116.

Furthermore, the torque element 124 is connected with a lever arm 132, which is movable to rotate the torque element 124. In the embodiment of FIG. 3, the lever arm 132 is an elongated rod having, on a proximate end, a head 132a fixedly attached to the torque element 124 and a distal end section 132b that is dynamically coupled with the movable drive member 108. The lever arm 132 is preferably about 2' to 3' (about 0.6 to 0.9 m) long, and may have a rounded, square, triangular, or other suitable cross section, typically having about 2" to 6" (about 0.05 to 0.13 m), for example about 4" (about 0.1 m) as the main cross sectional dimension. By driving the distal end section 132b of the lever arm 132, the torque element 124 may be rotated about the axis XX. Rotation of the torque element 124 causes the row 104 of solar panels 106 to rotate about the same axis XX.

It will be understood that the lever arm, instead of being connected with the torque element 124 by means of the fixedly attached head 132a, may be indirectly connected with the torque element 124 using for instance gear wheels and/or a belt and/or a chain.

In preferred arrangements, one drive mechanism may be employed to drive 8 to 16 rows of solar panels into rotation, and more preferably about 12 rows of solar panels. In the embodiment of FIG. 1, each row of the array 102 is divided into two sections distributed on either side of the movable drive member 108 and/or lever arm 132. The rows may be spaced preferably about 21' to 24' (about 6.4 to 7.3 m) apart. In one preferred format, 40 solar panels may be provided in a row and each solar panel is about 4' (1.2 m) wide by 10'6" (3.2 m) long. In another preferred format, 20 solar panels may be provided in a row and each solar panel is about 5'4" (1.6 m) wide by 16' (4.9 m) wide. Either of these types of solar panels is readily, commercially available.

The head 132a may be of a rectangular shape, for instance square as shown, and have a maximum width of about 4" to 6" (about 0.1 to 0.15 m) or it may be, for example, of a circular or triangular shape. The torque element 124 may be any type of elongated, pivotable or rotatable element. Suitable torque elements include, for example, an elongated rod, rectangular bar, and elongated tube. Shown in the present embodiments is an elongated tube of substantially rectangular cross section.

Figure 4:
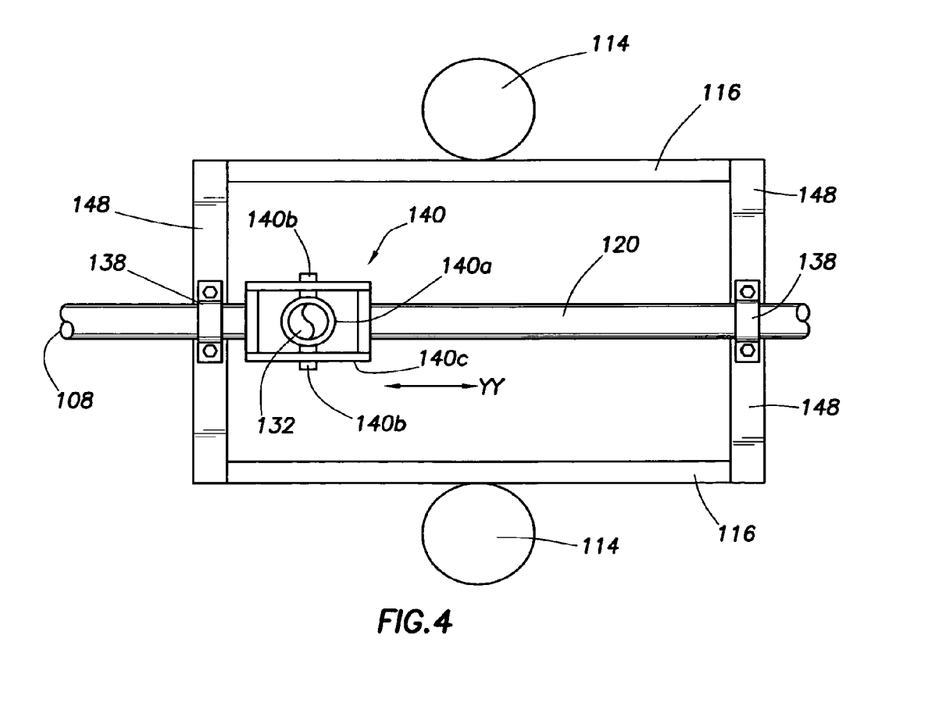
FIG. 4 is a schematic top view of a dynamic coupler, according to an embodiment of the present invention.

Referring also to the plan view of FIG. 4, cross beams 148 may be provided between support beams 116. The linear travel of the movable drive member 108, or more specifically, the driving section 120, may be facilitated by a pair of linear sleeve bearings 138 that are mounted on the cross beams 148. The distal end section 132b of the lever arm 132 travels between the sleeve bearings 138 as the entire movable drive member 108 is reciprocally driven back and forth along the direction YY and along the predetermined linear path by operation of the drive mechanism 118. The distal end section's length of linear travel preferably corresponds to the operable rotation of the row 104 of solar panels 106 during the day. As the movable drive member 108 and thus, the distal end section 132b of the lever arm is moved toward the right in FIGS. 3 and 4, the row 104 of solar panels 106 rotates in the counter-clockwise direction (as shown in FIG. 3).

The movable drive member 108 is dynamically coupled to the lever arm 132 by means of a dynamic coupler 140 such that the lever arm 132 is drivable by the drive member 108 to rotate said torque element 124.

A dynamic coupler may be coupling two mechanical elements so that one can transfer a load to the other (for example, to drive the other) thereby allowing at least two degrees of freedom of movement of one element relative to the other element. The dynamic coupler as shown in the present embodiments of the invention allows for a translational degree of freedom in addition to a rotational degree of freedom of the drive member 108 relative to lever arm 132. Herewith, a common point, at which these two elements are coupled and drivingly engaged, moves translatingly along the lever arm 132 as the load is being transferred. Hence, the two elements are not fixed together.

The dynamic coupler in one embodiment of the invention as shown in detail in the top view of FIG. 4, comprises a gimbal sleeve bearing 140, intercoupled with the driving section 120 of the drive member 108. To highlight the features of the gimbal sleeve bearing 140, sections of the lever arm 132 and the torque element 124 are hidden in the view.

As shown, a suitable gimbal sleeve bearing 140 may include a dynamic, rockable sleeve 140a that is mounted by rocking pins 140b to a frame 140c. The rocking pins 140b allow the sleeve 140a to rock relative to the frame 140c. The frame 140c may be provided as a cutout section and integral part of the driving section 120 and is sufficiently long and wide to accommodate the rocking movement of the lever arm 132 therein. The sleeve 140a is best rockable about and axis perpendicular to the movable drive member's linear path.

The rocking sleeve 140a is sized to accommodate the dimensions of the lever arm 132, so that the rockable sleeve 140a makes frictional, driving contact with lever arm 132 and thus drives the sleeve 140a when the driving section 120 is linearly driven but allows the distal end section 132b to pass through it. As the distal end section 132b moves relative to the sleeve 140a, the location of driving contact (on the lever arm 132) between the two components also changes. More specifically, a gimbal sleeve bearing 140 may be employed to dynamically couple the distal end section 132b of the lever arm 132 and the driving section 120 of the movable drive member 108.

Another type of dynamic coupler suitable for the system 100 is, for example, an assembly that employs a pair of parallel, rotatable pins instead of the gimbal sleeve 140a. The pins may be supported on a cradle that rocks the pins (similar to the action of the sleeve 140a) as the lever arm passes through it and as the pins rotate about their longitudinal axes to facilitate passage of the lever arm therebetween.

Figure 5:
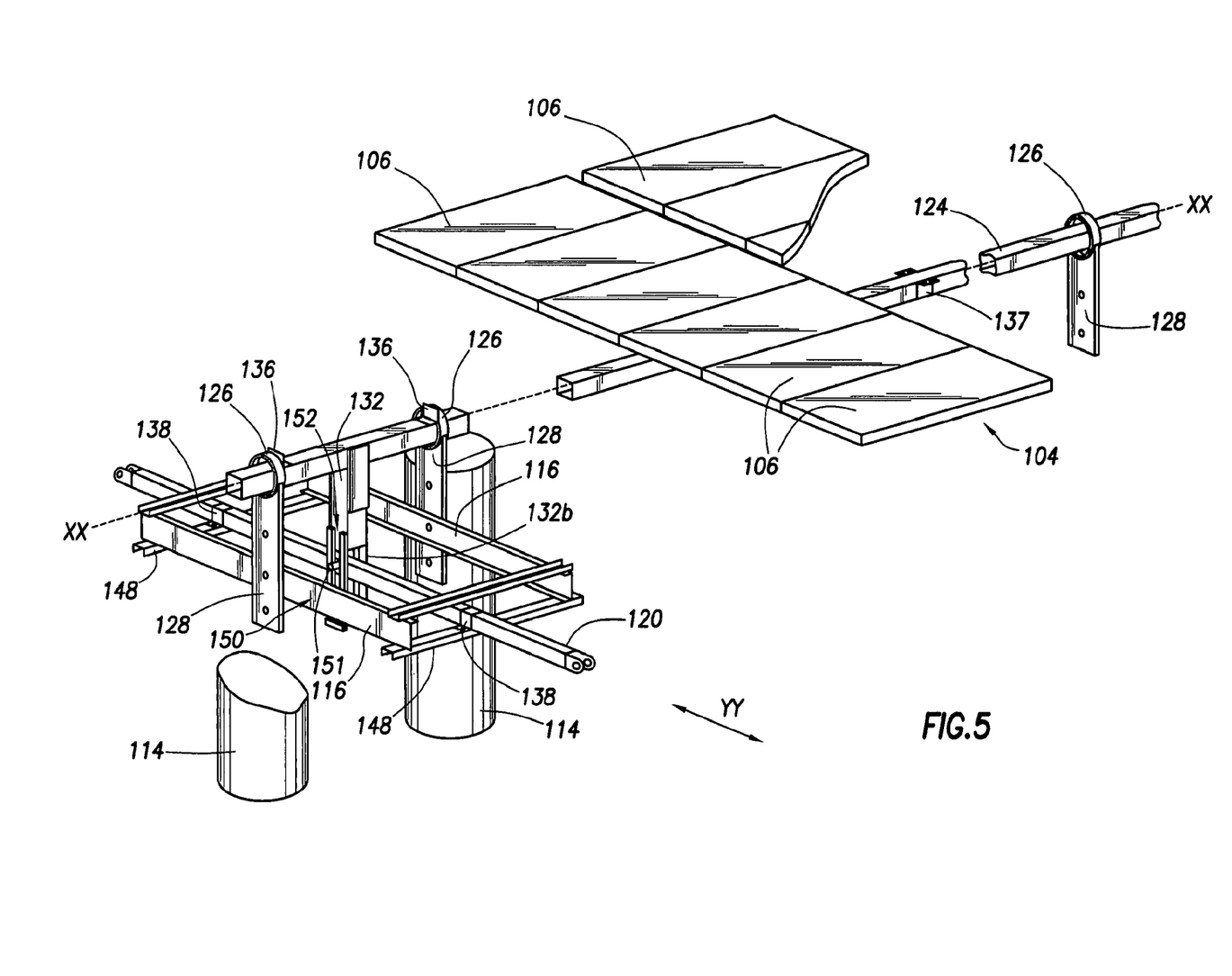
FIG. 5 is a schematic detailed view of a tracker drive system according to another embodiment of the invention.
Figure 7A:
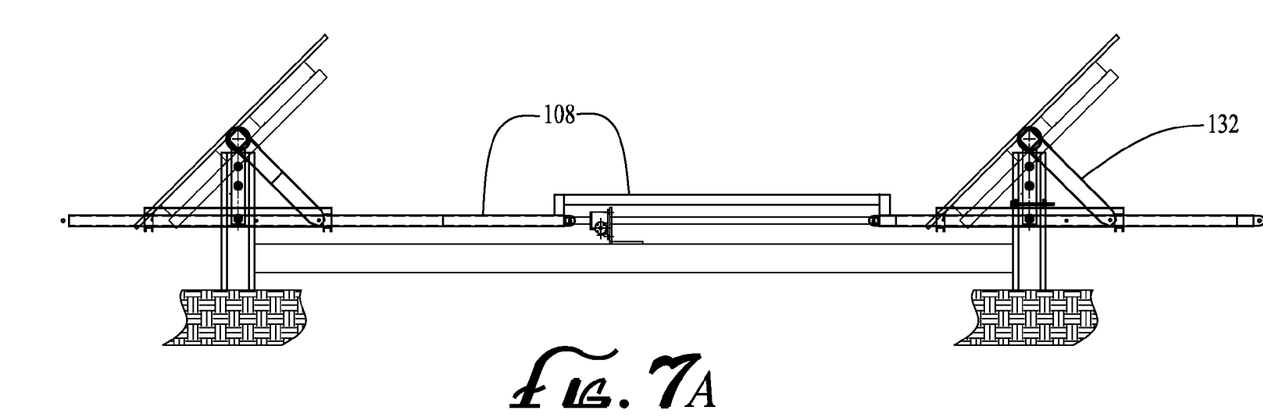
FIG. 7A is a schematic end elevation view of two rows of solar panels in the system of FIG. 1 with a single support beam and the panels tilted to the left.
Figure 7B:
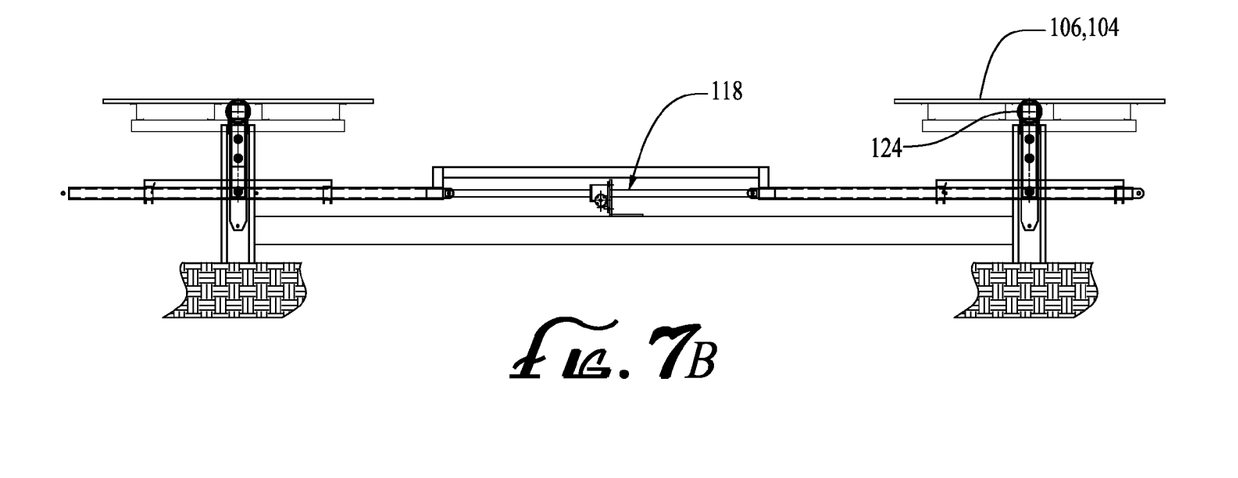
FIG. 7B is a schematic end elevation view of two rows of solar panels of FIG. 7A with the panels horizontal.
Figure 7C:
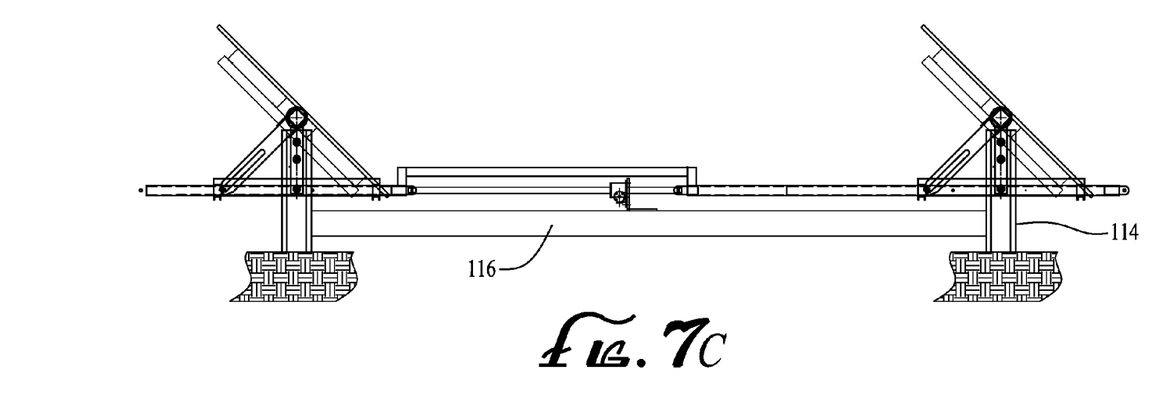
FIG. 7C is a schematic end elevation view of two rows of solar panels of FIG. 7A with the panels tilted to the right.
Figure 7D:
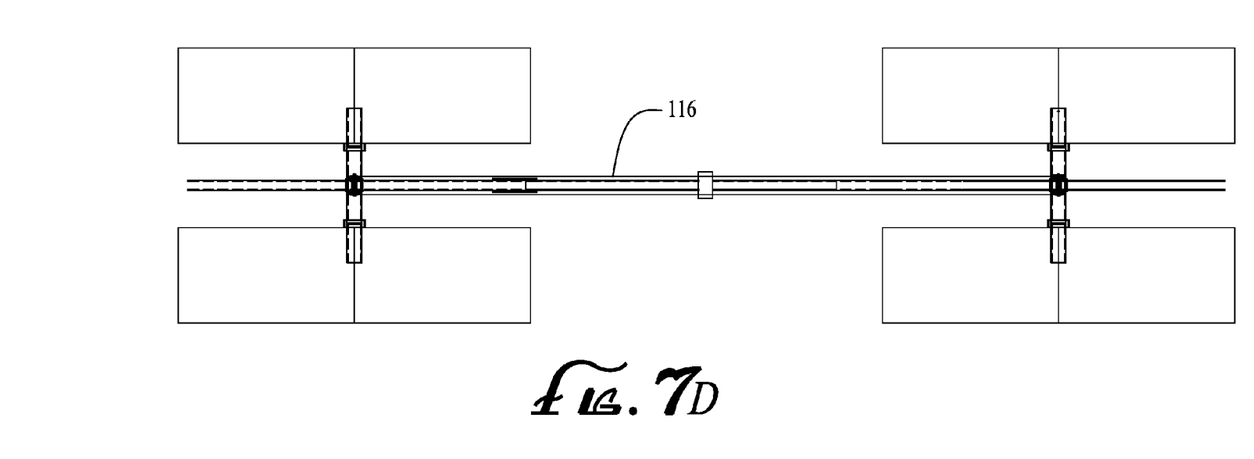
FIG. 7D is a schematic top view of two rows of solar panels of FIG. 7A.
Figure 8A:
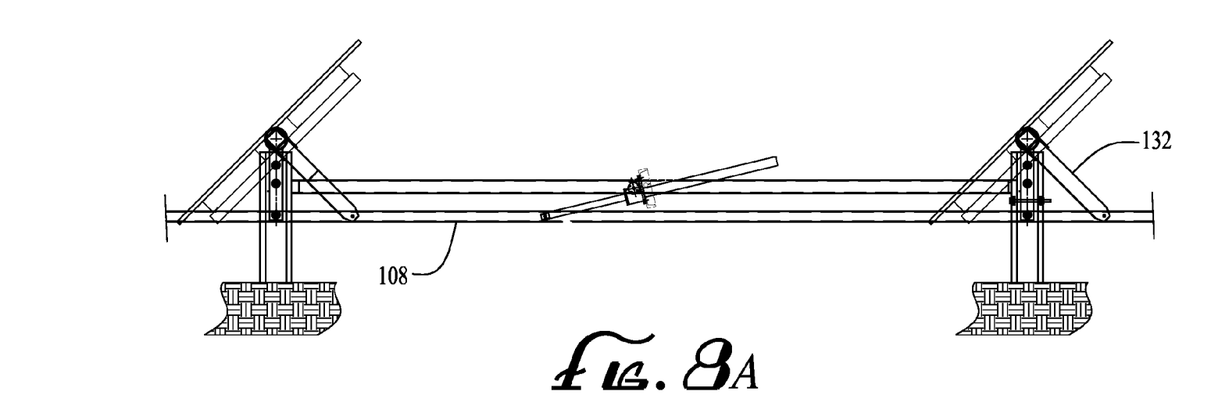
FIG. 8A is a schematic end elevation view of two rows of solar panels in the system of FIG. 1 with two parallel support beams and the panels tilted to the left.
Figure 8B:
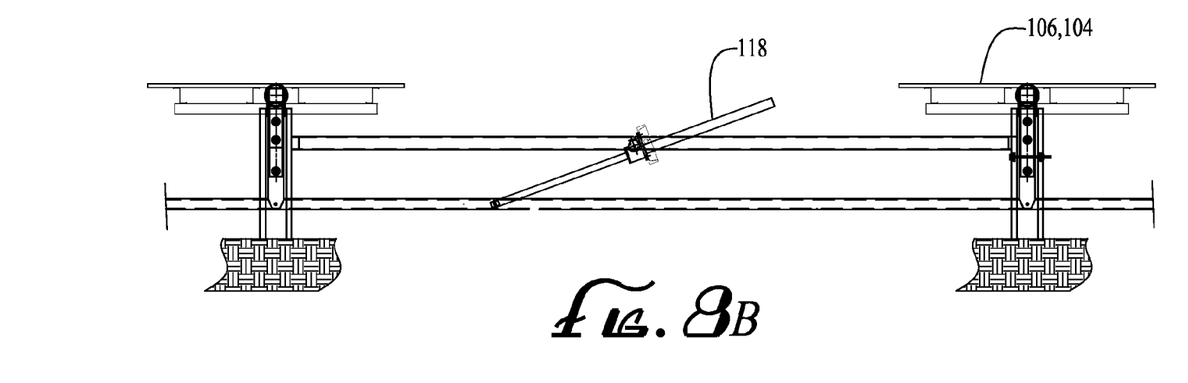
FIG. 8B is a schematic end elevation view of two rows of solar panels of FIG. 8A with the panels horizontal.
Figure 8C:
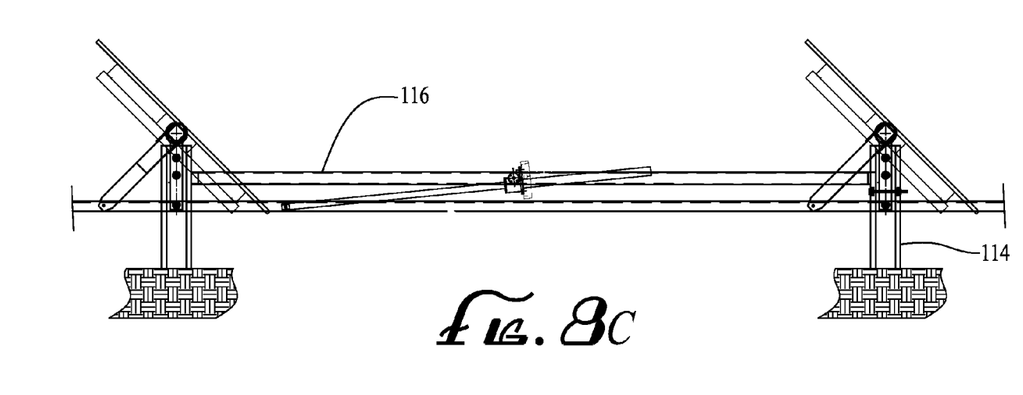
FIG. 8C is a schematic end elevation view of two rows of solar panels of FIG. 8A with the panels tilted to the right; and, FIG. 8D is a schematic top view of two rows of solar panels of FIG. 8A.
Figure 8D:
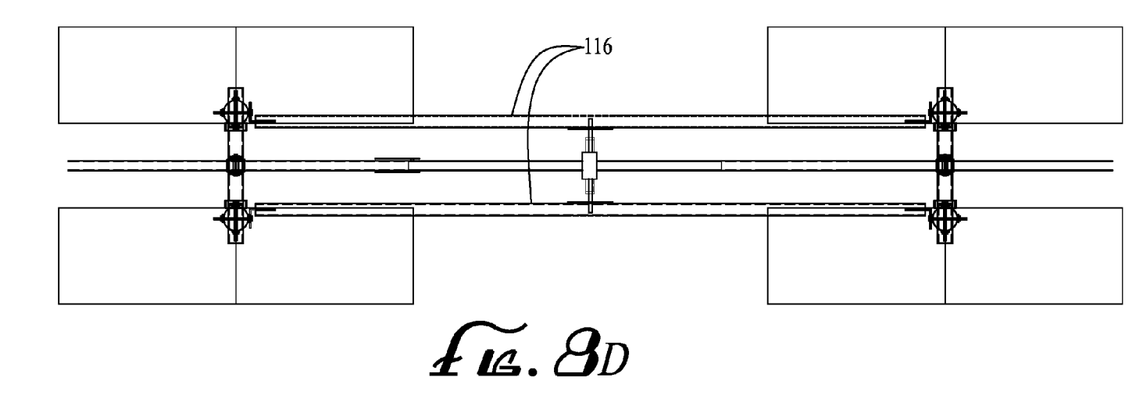

Yet another suitable dynamic coupler is illustrated in FIG. 5 at reference number 150. It comprises a slider pin 151 and slot 152 combination. The slider pin 151 may be provided as extending from the side of the drive member 108 in a direction generally parallel to the XX axis and the torque element 124. The slot 152 may be provided in the distal end section 132b of the lever arm 132 and positioned so as to receive the slider pin 151. As the drive member moves in the YY direction, the drive member 108 drivingly engages the lever arm 132 at the point of contact between the pin 151 and the slot 152, thereby causing the lever arm 132 to move angularly. As with the previously described suitable dynamic couplers, the point of driving contact between the pin 151 and the slot 152 of the lever arm 132 moves as the drive member 108 moves linearly and the lever arm 132 moves angularly.

In still another embodiment, the slider pin 151 of FIG. 5 is provided with a roller to reduce friction between the pin and the slot 152.

In addition to the pin and slot construction of the dynamic coupler 150, FIG. 5 also shows embodiments of parts that have already been identified with reference to the preceding FIGS. 1 to 4. In addition, FIG. 5 also displays optional brackets 136 to prevent the torque element 124 from sliding through the journal bearing mounts 126 in the XX direction, as well as a schematic mounting bracket 137 that may be employed for mounting the solar panel 106 to the torque member 124.

The dynamic couplers shown and/or described above have in common that the drive member 108—more specifically the driving section 120—is engaged translatable along the lever arm 132 in a direction to and from the proximate end thereof and allowing relative rotation of the lever arm 132 and the drive member 108 about an axis parallel to the XX axis.

The gimbal sleeve bearing 140 dynamically couples the movable drive member 108—in the shown embodiment, the driving section 120—with the lever arm 132 such that movement of the drive member 108 causes the lever arm 132 to rotate the torque element 124 about the XX axis, but allows freedom of movement of the lever arm 132 through the driving section 120 during rotation. Moreover, the configuration of the dynamic coupler 140, 150 and the lever arm 132 provides for the torque, T, applied to the torque element 124 to vary as the driving section 120—and the dynamic coupler—travels between the two linear sleeve bearings 138 (as further described below).

As the driving section 120 moves from left to right (YY) in FIGS. 3 and 4, the distal end section 132b of the lever arm 132 passes downward through the gimbal sleeve 140a and the point of driving contact by the gimbal sleeve 140a moves upwardly on the lever arm 132. Similarly, as the driving section 120 moves along the YY direction in FIG. 5, the sliding pin 151 (defining the point of driving contact) pass through the slots 152 on the distal end 132b of the lever arm 132 away from the torque element 124 and its axis of rotation (XX).

Figure 3A:
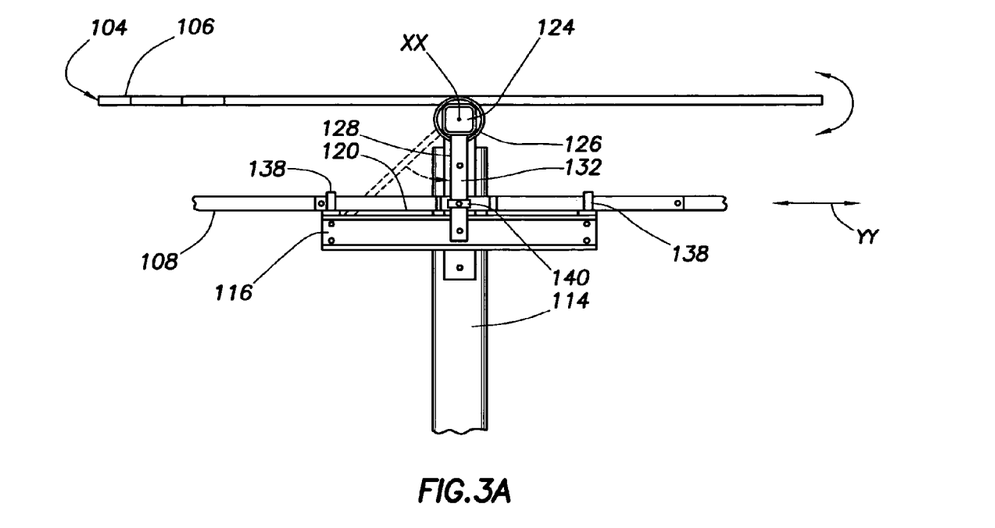
FIG. 3A is a schematic elevation end view of the portion of the tracker drive system in FIG. 3 at a second position of the row of solar panels.

Starting in a first extreme position, the linear movement of the driving section 120 first causes a rotation of the torque tube 124. During this initial rotation, the effective length of the lever arm 132 (effective lever arm length, L) changes (as the distal section 132b is passed down relative to the dynamic coupler 140, 150 and below the horizontal line of the driving section 120). This reduces the length or distance between the driving section 120 and the point of attachment to the torque element 124. FIG. 3A depicts the components including the gimbal sleeve midway through operable rotation, whereby the row 104 may be oriented at a generally horizontal orientation. The frame 140c (in driving section 120) has traveled midway between the linear sleeve bearings 138 and the effective length of the lever arm 132 is at a minimum. After this midway point, the distal end section 132b begins to retract from the gimbal sleeve 140, thereby increasing the effective length, L, of the lever arm 132.

The effective length of the lever arm 132, L, is maximum at the extremes when the solar panel 106 orientation is, for example, at 45° east or 45° west. The effective lever arm length, L, is longer at the extremes (for example, approximately 41% longer when the rotation from 45° east to 45° west applies) compared to its length when the lever arm 132 is at vertical (which correspond to midway travel of the gimbal sleeve bearing 140 between the linear sleeve bearings 138). The change in the effective lever arm length, L, changes the force, F, required to turn the torque element 124. The torque, T, generated at torque tube 124 is a product of the Force, F, applied to the lever arm 132 by the drive member 108 at the gimbal sleeve 140*a* (point of dynamic contact between the gimbal sleeve 140*a* and lever arm 132) and the distance or length, L, between this point of dynamic contact and the torque tube 124. Thus, by extending the effective lever arm length (L) at the extremes, the perpendicular force (F) required to generate the required torque (T) is reduced (T=F× L). FIG. 6 illustrates the resistant forces from the lever arm 132 at the positions of the components corresponding to those shown in FIG. 3. The horizontal force component, F, is the resistant force applied by the drive member 108 through the sleeve 140*a*.

For a constant torque, the force exerted on the dynamic coupler at the extremes is reduced (for example by approximately 30% when 45° east or west apply as the extremes) as compared to the force exerted when the lever arm 132 is at the vertical or minimum effective lever arm length position. Additionally, the dynamic coupler further reduces the resistance force exerted on the drive mechanism 118 by transferring some of the torque-induced lever arm load to the cross beams 148 and then the foundations 114.

For example, when the driving force imparted by the lever arm 132 is resolved at the 45° position as shown in FIG. 6, a vertical component of the resistant force (Fv=F sin 45°) results. This force, Fv, is transmitted to the linear sleeve bearing 138 to the linear sleeve bearings 138 and thus, to the cross beams 148. The horizontal component of the force, Fh, is transmitted along the horizontal axis to the drive mechanism 118 but its magnitude is about 30% reduced from the driving force (Fv=−F cos 45° or 0.707 F). When both of these features are considered, the overall reduction of force exerted against the drive mechanism 118 and/or drive member 108 may be reduced by about 50%. A reduction of this kind, 50% as calculated for this example, is realized for any dynamic coupler when the invention is compared to systems using a fixed lever arm length subject to constant torque conditions.

The embodiments of the invention employing dynamic coupling in accordance with the above not only benefit from reduction of the force but also have other advantages. Among the other advantages is that dynamic coupling allows for robustly mounting of the drive mechanism 118 because it only needs to impart an exclusively linear motion to the drive member 108.

It will be understood that the principles set out above with reference to FIGS. 3*a* and 6 and a dynamic coupler in the form comprising a gimbal sleeve 140, are valid for other types of sliding dynamic couplers including those disclosed above such as the embodiments comprising the pin and slot construction.

In preferred embodiments, the tracker drive system 102 includes the drive mechanism 108, the movable drive member 108; the gimbal sleeve bearing 140 or other dynamic coupler, the lever arm 132, the torque element 124, and sub-components of these components. In preferred embodiments, the tracker drive system 112 also includes a main processor 170 to operate the actuator 118 throughout the day. Such a main processor or other controller is generally known and may be integrated with the above-described system by one skilled in the art, upon a reading of the present description and/or viewing of the accompanying drawings.

The array 102 of rows 104 of solar panels 106 may be driven by a single drive mechanism. The horizontal drive members 108 may be tubular and may be joined to each of the various lever arms 132 by way of dynamic couplers. In further embodiments, two or more drive mechanisms may be dedicated to certain rows of solar panels.

The tracker drive system may support and drive one or more solar panels that are rotated throughout the day in accordance with the position of the sun relative to the earth. The solar panels may be, for an example, photovoltaic cells or heating devices that are designed to absorb radiation from the sun. The solar panels are preferably rotated about a generally north-south axis from a generally east-facing orientation to a mid-day, generally horizontal orientation, and to a generally west-facing orientation at the end of the day. In this way, the system presents a more direct face of the solar panels to the sun as the sun traverses from east to west during the day. This provides for more efficient and effective absorption of electromagnetic radiation by the solar panels, as previously described.

Among other advantages and benefits of some embodiments of the invention is that a dedicated foundation is not required for the drive mechanism. This facilitates construction and design and, to some degree, reduces the number of components required of the system. This design also reduces the cost of the system.

The foregoing description of the present invention is presented for purposes of illustration and description. It is to be noted that the description is not intended to limit the invention to the various apparatus and methods disclosed above. Various aspects of the invention as described may be applicable to other types tracker drive systems, including single axis and multiple axis drive systems, as well as to other types of solar energy collection systems or other rotatable tracking systems. For example, the inventive dynamic coupler and/or linear actuator installation may be employed to rotate equipment other than solar panels.

Furthermore, the invention is not limited to employing solar panels with a straight cross section, but can have a curved cross section such as a parabolic cross section.

Furthermore, it is contemplated that the apparatus and systems may have different configurations and employ one or more of the various aspects of the invention. For example, the dynamic coupling system may be employed with a drive mechanism installation other than one supported and between the foundations of the solar panels. Moreover, other drive mechanisms or actuators may be employed. Such variations of the invention will become apparent to one skilled in the relevant mechanical or other art and provided with the present disclosure. Consequently, variations and modifications commensurate with the above teachings, and the skill and knowledge of the relevant art, are within the scope of the present invention. The embodiments described and illustrated herein are further intended to explain the best modes for practicing the invention, and to enable others skilled in the art to utilize the invention and other embodiments and with various modifications required by the particular application or uses of the present invention.

The invention claimed is:

1. A solar energy collection system comprising:
   a first row of solar panels;
   a first foundation positioned to substantially support said first row of solar panels;
   at least a second row of solar panels;
   a second foundation positioned to substantially support the load of said second row of solar panels;
   one or more support beams supported on said first and second foundations;
   and a tracker drive system comprising:
   a first torque element associated with said first row of solar panels;
   a second torque element associated with second row of solar panels, each of said torque elements being mounted for rotation about a generally north-south axis and supporting said first or second row of solar panels for rotation therewith about the generally north-south axis;

a first lever arm and a second lever arm, each said lever arm being connected with one of said first or second torque elements and movable to rotate said first or second torque element;

a drive member movable along a path whereby movement of said drive member actuates rotation of said first and second lever arms to rotate said first and second torque elements about said generally north-south axes; and, a drive mechanism mechanically coupled with said drive member to drive said drive member along said path, wherein said drive mechanism is mounted so as to be supported by said first and/or second foundation and wherein said drive mechanism is a linear actuator that is supported on said one or more support beams such that loads exerted by said drive mechanism are transferred to said first foundation and said second foundation.

2. The system of claim 1 wherein said first foundation and said second foundation are each attached to a single concrete base or grade beam that extends between and connects said first foundation to said second foundation at or below grade.

3. The system of claim 1 further comprising vertically adjustable torque element bearings supporting said torque elements.

4. The system of claim 1 further comprising multiple foundations made of wide flange steel beams or concrete piers supporting said first and second row of solar panels along a generally north south axis positioned directly in the earth without a poured concrete footing.

5. The system of claim 1 further comprising:
said linear actuator having
a connection point at each end of said linear actuator, each said connection point connecting to said drive member at one end and connecting to said drive member at the other end; and,
said linear actuator positioned co-linear with said drive member ends.

6. The system of claim 1 further comprising additional rows of said solar panels positioned east and west of said first row and of said second row, said additional rows of solar panels each having additional torque elements and additional lever arms wherein said additional lever arms are linked to said drive member of said first and second rows and adapted to rotate said additional rows of solar panels about a generally north south axis.

7. The system of claim 1 further comprising said first and second row of solar panels wherein the solar panels are mounted to struts attached to the bottom of said first and second torque elements and on each side of said first and second torque elements.

8. A solar energy collection system comprising:
a load comprising a first row of solar panels and a second row of solar panels;
a first foundation substantially supporting said first row of solar panels;
a second foundation substantially supporting said second row of solar panels;
at least one support beam supported on said first and second foundations; and,
a tracker drive system comprising:
a first torque element associated with said first row of solar panels;
a second torque element associated with second row of solar panels,
said first torque element and said torque element mounted for rotation about a generally north-south axis;
said first torque element supporting said first row of solar panels for rotation therewith about the generally north-south axis;
said second torque element supporting said second row of solar panels for rotation therewith about the generally north-south axis;
a first lever arm connected to said first torques element and movable to rotate said first torque element;
a second lever arm connected to said second torque element and movable to rotate said second torque element;
a drive member movable along a path whereby movement of said drive member actuates rotation of said first and lever arm and second lever arm to rotate said first torque element and said second torque element about said generally north-south axes; and,
a drive mechanism mechanically coupled with said drive member to drive said drive member along said path,
wherein said drive mechanism is supported by said first foundation and said second foundation, and is adapted to transfer said load to said first foundation and to said second foundations.

9. The system of claim 8 wherein said drive member has a linear path and is dynamically coupled to said first and second lever arms of variable effective length;
whereas the effective length of first and second lever arms is at a minimum when the surface area of the solar object is horizontal to the earth and the effective length of said lever arms is maximum when the surface area of the solar object is at maximum tilt.

10. The system of claim 8 wherein said drive member is made of steel tubing of round or square cross-section.

11. The system of claim 8 wherein said drive mechanism includes a motor and gearbox.

* * * * *